United States Patent [19]
Leblanc

[11] 3,975,474
[45] Aug. 17, 1976

[54] VIEWER

[75] Inventor: Conrad L. Leblanc, Leominster, Mass.

[73] Assignee: Foster Grant Co., Inc., Leominster, Mass.

[22] Filed: Mar. 1, 1973

[21] Appl. No.: 337,245

[52] U.S. Cl. ............................... 264/23; 156/73.3; 156/108; 156/251; 156/261; 156/293; 156/298; 156/306
[51] Int. Cl.² ...................... B06B 3/00; B29C 27/08
[58] Field of Search ................ 264/23, 153, 2, 248, 264/259, 25, 163, 138; 156/73, 250, 251, 293, 303.1, 306, 515, 73.3, 108, 261, 298; 351/41, 49, 177, 178; 350/178, 319, 125 NG, 252

[56] References Cited
UNITED STATES PATENTS

| | | | |
|---|---|---|---|
| 2,323,518 | 7/1943 | Cochran | 351/49 UX |
| 2,423,583 | 7/1947 | Cooper | 351/177 X |
| 2,431,238 | 8/1974 | Friedman | 351/178 |
| 2,647,852 | 8/1953 | Franklin | 156/251 |
| 3,291,669 | 12/1966 | Osher | 156/73 |
| 3,399,018 | 8/1968 | Leblanc | 351/178 |
| 3,475,521 | 10/1969 | Stroop | 264/153 X |
| 3,558,407 | 1/1971 | Ballard et al. | 156/73 |
| 3,647,612 | 3/1972 | Schrenk et al. | 264/171 |
| 3,704,188 | 11/1972 | MacDuff | 156/73 |

Primary Examiner—W.E. Hoag
Attorney, Agent, or Firm—Leonard S. Selman

[57] ABSTRACT

A 3-D viewer and the method and apparatus for the fabrication thereof, said viewer including a pair of plastic polarized lenses each ultrasonically cut out from a sheet of polarized material simultaneously ultrasonically sealed about a lens opening in a lens receiving frame.

6 Claims, 4 Drawing Figures

VIEWER

BACKGROUND OF THE INVENTION

This invention is primarily directed toward a method and apparatus for fabrication and the fabricated item itself which comprises a viewer for use by persons attending "3-D" or three dimensional movies.

The viewer preferably consists of a pair of spectacles which include a polarized lens which is positioned over each eye. Each polarized lens has its optical axis specially oriented so that the superimposed images commonly projected on a single screen can be viewed separately by each eye and thus the illusion of depth is created in a manner understood in the art.

The viewer is ordinarily handed out to the audience in attendance and thus it is most desirable to be able to provide a low cost viewer that can be kept or thrown away by the customer as desired. To achieve this low cost a new method of cutting out lenses from sheet material and attaching the lenses to the front frame of the spectacles has been devised which results in a viewer which has achieved wide acceptance and usage.

SUMMARY AND OBJECTS OF THE INVENTION

The invention briefly consists of the use of an ultrasonic device which has the capability of cutting out lens shaped pieces from preformed sheets of polarized sheet material and simultaneously seal the cutout lenses to a pair of lens openings in a prefabricated front frame portion of a spectacle type viewer. To accomplish the cutting and sealing functions a specialized ultrasonic cutting and welding tool was designed to cut through the sheet of plastic polarized sheet material and at the same time impart ultrasonic vibrations to the elements to be sealed in a manner generating kinetic energy between the interfaces of the lens material causing the plastic material to flow and form a weld joint between the lenses and frame. This operation which can be accomplished on automatic machinery taking about a half to two seconds and eliminating all manual handling of the lenses and frames allows the production of such viewers at a much lower cost than heretofor possible.

Although this invention has such a 3-D viewer as its primary objective it is obvious that the invention is applicable to cutting out and sealing to frames other types of plastic lenses which need not necessarily be of the polarizing type.

Thus it is the object of this invention to provide a method for producing an economical spectacle type viewer for use in 3-D motion picture theatres.

It is a further object of this invention to provide a method for cutting out lenses from a sheet of plastic material and simultaneously sealing the lenses about the lens openings in a spectacle frame.

It is a still further object of this invention to provide a method which utilizes ultrasonic cutting and sealing means to simultaneously cut a lens of plastic polarizing material from a sheet thereof and seal the lens about the lens opening in a front frame portion of a spectacle type viewer.

It is another object of the invention to provide an inexpensive viewer for 3-D motion pictures including a pair of lens joined to a spectacle type front frame.

It is still another object of the invention to provide a spectacle type viewer including a pair of plastic polarized lenses joined to a front frame portion of said viewer about the lens openings therein by a welded joint formed of ultrasonically displaced material.

Yet another object of this invention is to provide a spectacle type viewer including at least one polarized lens simultaneously ultrasonically cut from a sheet of said material and ultrasonically sealed to a front frame portion of said viewer about a lens opening therein.

An additional object of the invention is to provide an ultrasonic tool or horn specifically shaped to carry out the disclosed cutting and sealing fabrication steps of the method producing the 3-D viewer.

Other objects of the invention will in part be obvious and will in part appear hereinafter.

DESCRIPTION OF THE PREFERRED EMBODIMENT

Figure 1:
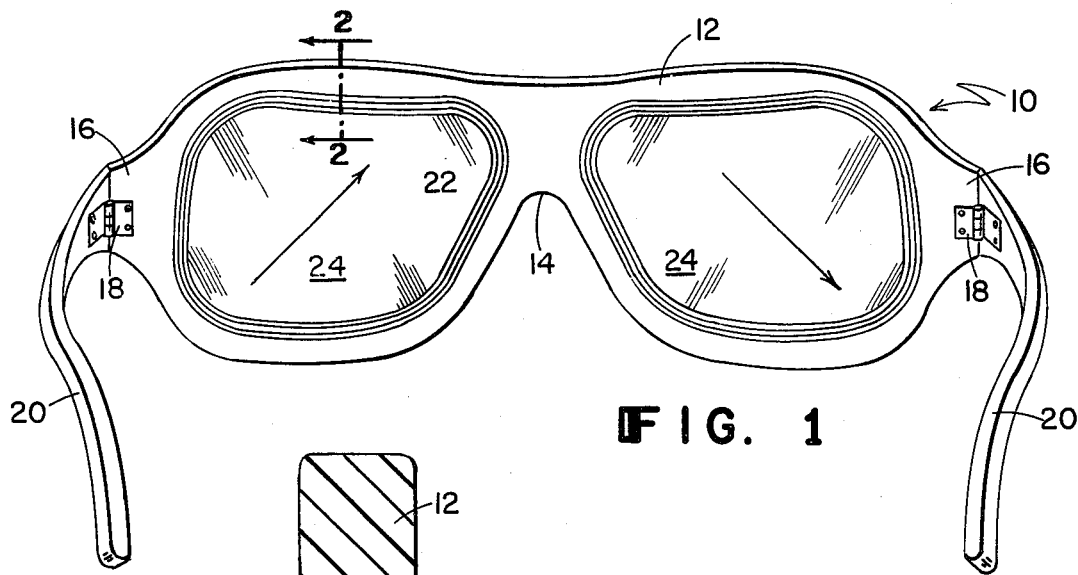
FIG. 1 is a rear view of the front frame of the spectacle type 3-D viewer showing the lenses in their sealed position.

Referring particularly to a FIG. 1 there is shown a 3-D viewer 10 having a front frame portion 12. The frame portion includes a bridge portion 14 for resting on the nose of the wearer and a pair of end portions 16 for receiving a pair of hinge elements 18. A pair of temples 20 are attached to the frame portion 12 by means of hinge elements 18.

The front frame has formed therein a pair of lens openings 22 which receive the pair of lenses 24. The lenses are preferably of known plastic polarizing sheet material comprising a thin layer of stretch oriented polyvinyl alcohol film stained with an iodine solution and laminated to a thin layer of cellulose acetate butyrate. The thickness of the lenses are kept at a minimum for purposes of economy and are between 0.004 to 0.006 inches thick. As shown schematically by the arrows on the individual lenses in FIG. 1 the polarized lenses are oriented in the lens openings so that the axis of polarization of each lens as shown in FIG. 1 is displaced 180° relative to the axis of the other lens.

The front frame portion 12 is formed of a plastic material which may be, for example, a high impact polystyrene. The use of other plastic materials for the frame portion 12 is forseen including various well known polymers such as acetate, etc. It is found, however, that the plastic frame material should have a similar melting temperature as the lens material to make a strong seal with the lens material as will be seen in the following description of the method of fabrication of the viewer. Both the lens and frame material must be of the type of plastic material known as thermoplastics in that they have the ability to be repeatedly softened by increase of temperature and hardened by decrease of temperature by means of physical changes.

Figure 3:
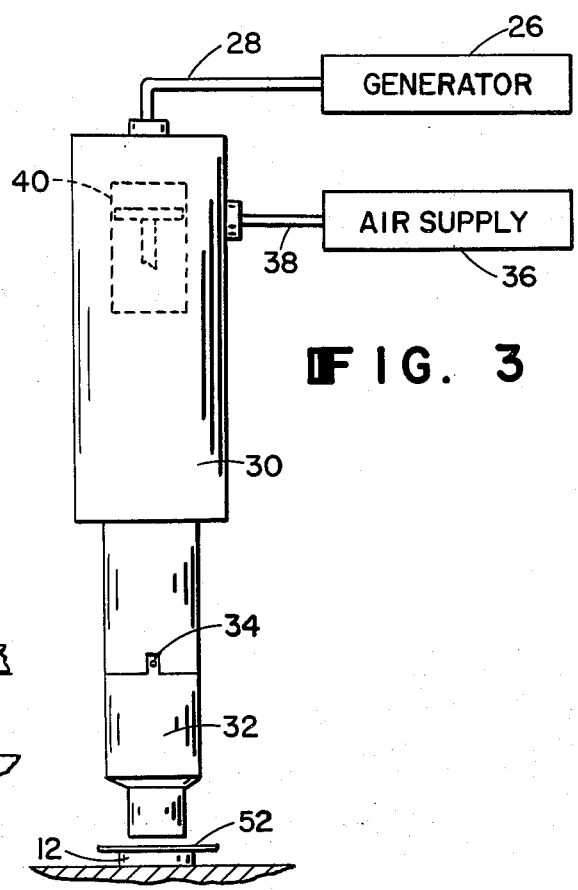
FIG. 3 is a schematic view of the ultrasonic apparatus utilized in the fabrication of the viewer.

As previously disclosed ultrasonic cutting and sealing techniques are utilized in the fabrication method which greatly simplifies the method and reduces its cost. For carrying out the method an ultrasonic device that has been successfully utilized is that manufactured by the Branson Sonic Power Company of Danbury, Conn. The device which as schematically represented in FIG. 3 includes a generator 26 cable 28 and the converter 30, which form a commercial unit available from Branson as Model 460, for example. The converter 30, in the model stated above, includes one or more piezoelectric disks (not shown) which convert the electrical energy supplied from the generator 26 to sonic energy. The converter 30 is fitted with a mechanical amplitude transformer 32, also known as a solid horn, made of metallic material, such as aluminum or titanium. The horn 32 is provided with a pair of threaded studs 34 for coupling to the converter 30. The amplitude of mechanical ascillations is amplified by the configuration of the horn 32 which is coupled by mechanical means to the piezoelectric disks as seen for instance in U.S. Pat. No. 3,328,610 issued to S. E. Jacke et al. entitled "Sonic Wave Generator" dated June 27, 1967. An air supply 36 is connected by tubing 38 to the converter 30 which has included thereon a piston arrangement 40, schematically shown, which includes well known valve arrangements which will allow the raising and lowering of the converter 30 and horn 32 in relation to the workpiece.

To transmit the kinetic energy to the horn 32 has formed on it a special edge which was designed to perform the cutting and sealing functions mentioned. As shown in FIG. 3, a sharp cutting edge 42 is formed on the outer periphery of the horn tip. The cutting edge comes to a sharp point as shown and its peripheral configuration is made to the desired lens shape. Immediately adjacent the cutting edge on the horn tip is a slight indention 44 which merges with a small flat portion 46 which is spaced slightly inwardly from the extreme end of the horn tip by the pointed cutting edge. The center portion 48 of the horn tip is hollowed in a manner which keeps it from contacting the workpiece. The amount hollowed out is also carefully calculated relative to the mass of the horn to achieve the vibratory effect required by the horn to perform its function.

Figure 2:
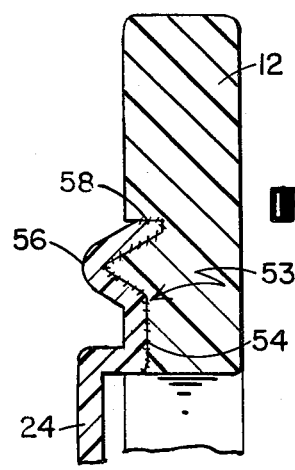
FIG. 2 is a fragmentary sectional view taken on lines 2—2 of FIG. 1.
Figure 4:
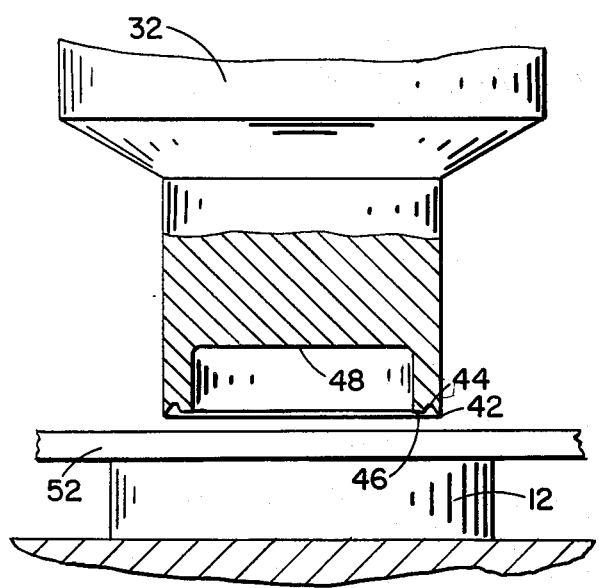
FIG. 4 is an enlarged fragmentary view of the ultrasonic cutting and sealing tool utilized shown partially in axial section.

In operation the vibrating horn is brought into contact with the workpiece which in the present case comprises a sheet of polarized plastic material 52 which overlies the front frame portion 12 as shown in FIG. 4. The horn 32 is moved downwardly powered by the piston arrangement 40. At a distance of about 0.010–0.020 of an inch before making contact with the sheet 52, the exciting circuit of horn 32 is activated which starts the ultrasonic vibrations. For best results, the horn 32 vibrates at about 20,000 cycles per second at the point of activation. As the cutting edge 42 contacts the sheet 52 it cuts smoothly therethrough aided by its vibrating motion. The flat portion 46 of the horn then immediately and simultaneously in the same downstroke of the horn comes into contact with the surface of sheet transferring the vibrations to the sheet 52 and the frame 12 in contact therewith. The kinetic energy generated between the interfaces of the sheet and frame and within the bodies thereof raises the temperatures therein to the flow state of the plastic materials they are made of and the two materials will flow together forming a weld joint 53 between them. As shown in FIG. 2 the flat portion in its downward stroke causes a noticeable depression 54 in the frame portion immediately adjacent the lens opening. Immediately adjacent the depression there is formed a small ridge 56 where the plastic material has flowed into the depression 44 formed in the horn 32 while in its plastic state and set in this shape. The material forming the ridge 56 is found to be a mixture of the plastic materials from which the frame 12 and the sheet 52 are composed of which have flowed together while in their plastic state. This is also true of the plastic material found at the bottom of depression 54 in the front frame member 12. The cut off peripheral edges 58 of each of said lenses is embedded into the frame material by the cutting edge 42 during the downward stroke of horn 32. Thus, the weld joint 53 includes the entire area of contact between the lens 24 and the frame 12 which are sealed together between their interface as shown in FIG. 2. As shown in FIG. 2 the interface between lens 24 and frame 12 is shown broken by small lines to indicate that the material of the lens and frame have flowed across the interface in forming the weld joint 53. After a period of about a half to two seconds, the horn 32 is retracted upwardly by piston arrangement 40 to await the next cycle.

Thus the object of the invention are achieved in a manner having many advantages over what has been known in this field of endeavor.

I claim:

1. A method for fabricating a viewer comprising placing a sheet of thermoplastic lens material in overlying and overlapping relationship to a frame, said frame having a lens opening therein and being formed of thermoplastic material heat sealable to said lens material;

contacting said sheet of lens material with a metallic horn of an ultrasonic energy transfer device, said horn having a downwardly extending cutting edge extending about its periphery and a substantially planar portion located inwardly from said cutting edge;

causing penetration of said sheet of thermoplastic lens material during an initial portion of a downward stroke of said horn by said cutting edge to ultrasonically cut a shaped lens from said sheet of thermoplastic material without penetrating completely through said frame;

causing, during a further portion of said downward stroke of said horn, said substantially planar portion on said horn to contact the sheet of lens material and impart kinetic energy thereto and to said frame causing the ultrasonically sealing of the shaped lens about the edges of said opening in said frame for said lens.

2. The method of claim 1 wherein said lens and frame material are caused to ultrasonically melt and flow together to form a weld joint between said lens and frame upon cooling.

3. The method of claim 2 including forming an indentation in said frame surrounding said lens receiving openings and causing said ultrasonically melted lens material to flow into said indentation forming a portion of said weld joint.

4. The method of claim 3 including the embedding of the cut off peripheral edge of said lens into the frame material.

5. The method of claim 2 wherein said lens is formed of transparent plastic polarizing material.

6. The method of claim 5 wherein said frame is formed of a molded polystyrene material.

\* \* \* \* \*